Oct. 4, 1960 W. A. EATON ET AL 2,954,854
BRAKE CONTROL MECHANISM
Filed Nov. 9, 1955 4 Sheets-Sheet 1

INVENTOR
WILFRED A. EATON
ROGER H. CASLER
BY *Scrivener & Parker*
ATTORNEYS

# United States Patent Office 2,954,854
Patented Oct. 4, 1960

2,954,854

BRAKE CONTROL MECHANISM

Wilfred A. Eaton, North Woodbury, and Roger H. Casler, Washington, Conn., assignors to Roy S. Sanford, Wilfred A. Eaton, and Erling D. Sedengren, all of Woodbury, Conn., and Roger H. Casler and James O. Eames of Washington, Conn.

Filed Nov. 9, 1955, Ser. No. 545,936

24 Claims. (Cl. 188—264)

This invention relates to brake control mechanism, and more particularly to control mechanism for controlling a brake of the power operated type.

One of the objects of the invention is to provide, in a brake of the normally power operated type, means for effecting manual operation of the brake in the event of power failure.

Another object of the invention is the provision of novel control valve means for a brake of the above type.

Still another object of the invention is to provide control valve means for effecting manual or power operation of a brake of the type having a liquid cooled brake actuator operated by the pressure of the cooling liquid.

Yet another object of the invention is to provide control valve mechanism for a brake of the above type, wherein the mechanism is so constituted as to permit manual operation of the brakes in the event of power failure without the need for an excessively long brake pedal stroke.

A further object of the invention is to provide control valve means for a brake of the above type, wherein the slack between the brake shoes and lining may be readily taken up under manual operation without excessive pedal stroke.

A still further object of the invention is to provide control valve mechanism for a brake of the above type, so constituted as to permit taking up of the slack between the brake shoe and brake lining on manual operation of the brake pedal without the use of excessive brake pedal pressure by the operator.

Yet another object of the invention is to provide brake control valve mechanism for a brake of the above type so constituted as to insure manual operation of the brakes in the event of power failure while the brakes are in the applied position.

A further object of the invention is to provide novel brake control valve mechanism for controlling the pressure of the cooling liquid in the brake actuator as well as the flow of cooling liquid through the brake valve.

These and other novel features and objects of the invention will be more fully understood when considered in the light of the following specification and the drawings. It is to be expressly understood, however, that the description and drawings are not to be taken as defining the limits of the invention, reference being had for this purpose to the appended claims.

In the drawings, wherein similar reference numerals are utilized to denote similar parts in the different views, Fig. 1 illustrates diagrammatically and partially in section, a brake system and brake control mechanism constructed in accordance with the principles of the invention;

Figure 1:
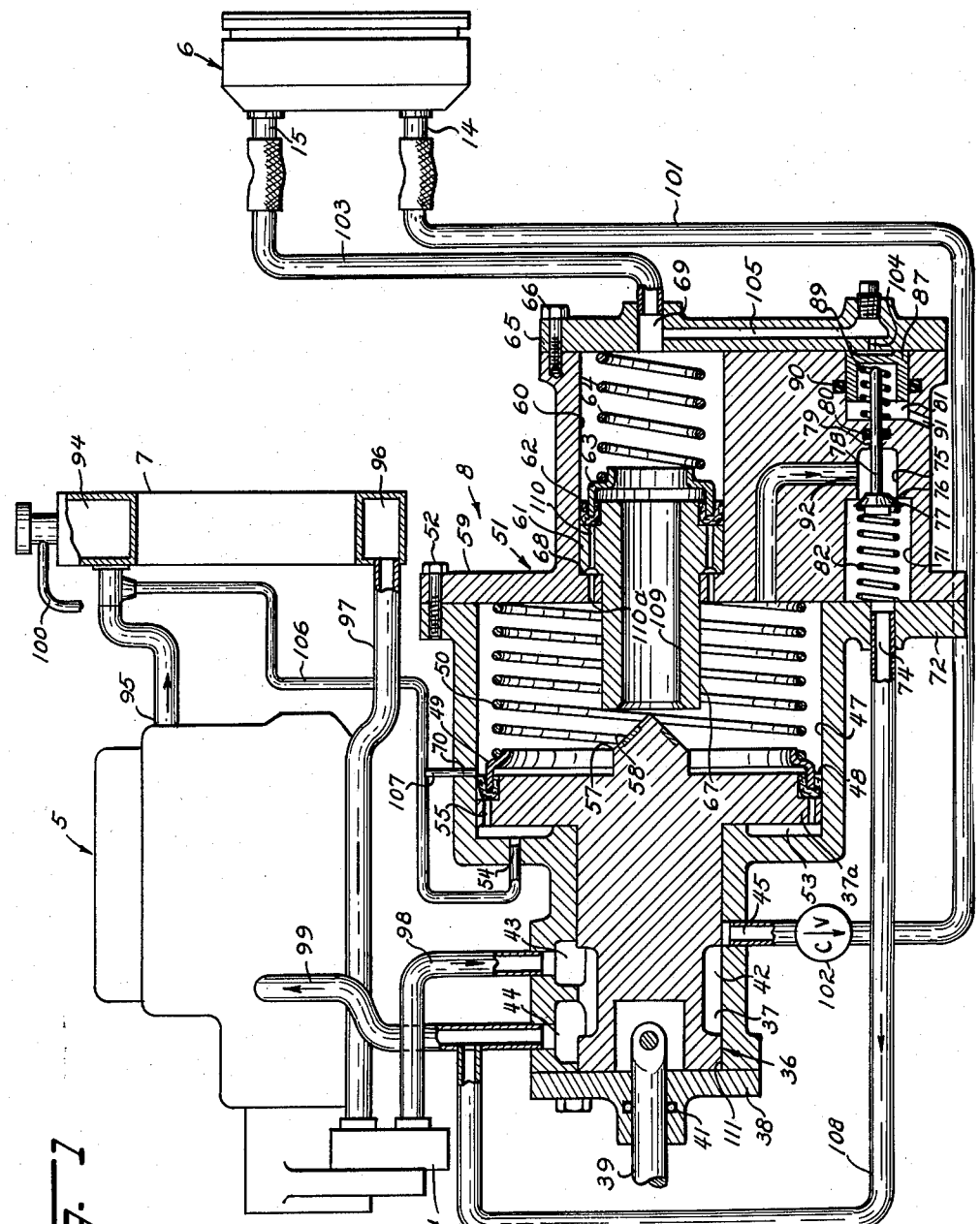

Referring more particularly to Fig. 1, the system in general includes a liquid circulating pump 4 suitably driven by vehicle engine 5, a brake actuator 6, which is of the type shown in Fig. 4, and a heat exchanger or engine radiator 7, these various units of the brake system being connected and operated as will be more fully described hereinafter.

Figure 4:
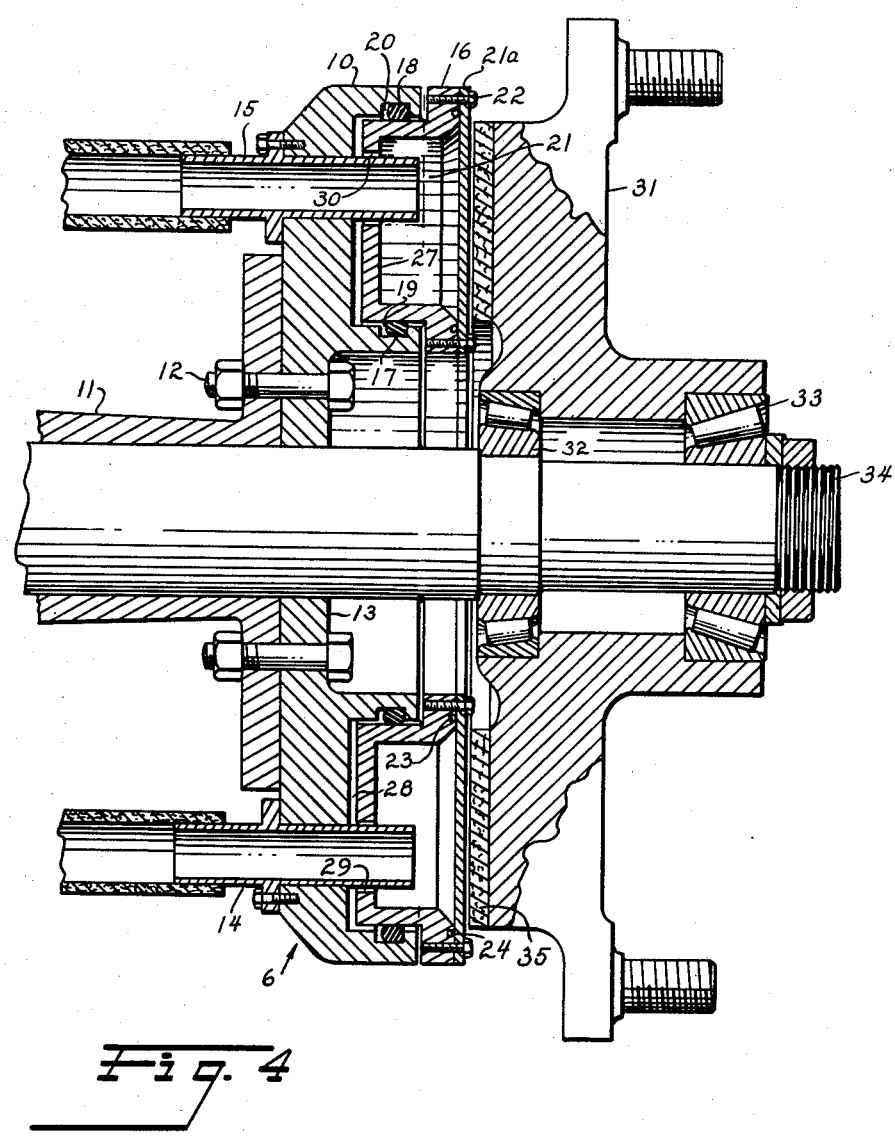
Fig. 4 is a sectional view of a brake actuator adapted for use in connection with the present invention.

The brake actuator 6, as shown in detail in Fig. 4, is of the liquid cooled type, adapted to be both cooled and actuated by a circulating cooling liquid. The actuator includes an annular cylinder 10 secured against rotation to an axle housing 11 by means of bolts 12. The annular cylinder has inner and outer walls concentric with the axis of the axle housing, the cylinder being open at the right end, and closed at the left end by a wall 13 integral with the cylinder walls. Inlet and outlet conduits 14 and 15 for the cooling and actuating fluid are secured to the wall 13 and extend therethrough and into the interior of the cylinder as shown. A rigid annular piston or brake shoe 16, which may be made of suitable material such as cast iron, steel, plastic, or the like, is mounted in the cylinder for sliding movement axially thereof on resilient sealing rings 17 and 18 positioned in grooves 19 and 20 in the cylinder walls as shown, the rings being compressed between the bottoms of the grooves and the corresponding piston walls in sliding frictional engagement with the latter and being of flexible and resilient rubbery material.

Since the resilient sealing rings 17 and 18 are mounted in grooves in the cylinder wall rather than in grooves in the piston, they are, on movement of the piston to effect a brake application, distorted in the direction of movement of the piston by virtue of their frictional engagement with the surface of the piston as well as by the action of the pressure in the cylinder thereon. Consequently, on release of pressure from the cylinder, the rings tend to return to their original position as shown in the drawing, and their frictional engagement with the piston wall causes them to always retract the piston slightly from the applied position. Consequently the piston is always biased toward a release position by the resilient sealing rings, and the degree of biasing force and the amount of the retracting movement is dependent on the characteristics of the material of which the sealing rings are made, the coefficient of friction between the sealing rings and the piston, the diameter of the sealing rings in cross section, as well as the degree of compression of the rings between the bottom of the ring groove in the cylinder wall and the wall of the piston. This arrangement provides not only for retraction of the piston automatically, but also provides an automatic slack adjuster action. The piston or brake shoe is definitely biased toward release position in order to prevent dragging of the brake, and consequently a certain amount of liquid has to be displaced in order to take up the slack in the brake shoe and effect engagement of the metallic friction element on the brake shoe with the composition friction ring on the wheel.

The piston 16 has an open ended annular channel or chamber 21 for circulation of a cooling liquid, and the channel is closed at the right end by a separate, relatively thin flat and flexible metal friction plate 21a, the plate being preferably of metal having a high heat conductivity and secured at its inner and outer peripheries to the end of the rigid piston as by means of cap screws 22. Thus the friction plate forms a part of the piston and moves bodily therewith, the mechanical force exerted by the piston being applied to the plate only on its inner and outer peripheral portions, and the plate itself being in effect a pressure responsive member or a diaphragm carried by the piston. This construction permits the braking torque to be transmitted from the thin friction plate to the rigid piston through the peripheral portions secured thereto as above described, and the torque is transmitted from the piston to the cylinder and axle housing by means to be described in more detail hereinafter. Annular sealing rings 23 and 24 are disposed in grooves in the right end of the piston as shown and in sealing engagement with the friction plate. The piston has a back wall 27, which forms in connection with the cylinder 10 an annular chamber 28. Enlarged apertures 29 and 30, through which conduits 14 and 15 pass, serve to connect piston channel 21 and the chamber 28. The piston is prevented from rotating in the cylinder by engagement of the inlet and outlet conduits 14 and 15 with the walls of the apertures 29 and 30. A wheel 31 is rotatably mounted by means of bearings 32 and 33 on an axle tube 34 carried by axle housing 11, the bearings serving to prevent movement of the wheel axially of the shaft in either direction. An annular friction ring 35 is adhesively or otherwise secured to the wheel for rotation therewith as shown, and positioned for engagement by the friction plate 21a on movement of the piston 16 to the right. The composition of the ring 35 is preferably such as to possess relatively low heat transfer qualities.

From the foregoing, it will be apparent that when a cooling liquid is supplied to the inlet conduit 14 by a suitable pump or other means and allowed to escape from the brake actuator through the outlet conduit 15, the cooling liquid will circulate through the annular piston channel from the bottom to the top in contact with the rear face of the metal friction plate 21a, and will thus serve to effectively cool the latter. In the event the liquid passing through the brake actuator as just described is pressurized, this pressure will be reflected in the chamber 28 through apertures 29 and 30, and this pressure will act on the annular area of the piston 16 as defined by the annular sealing rings 18 and 19 to move the piston and the friction plate 21a to the right to effect engagement of the latter with the face of the friction ring 35. It will also be noted that the effective area of the piston, the area of that part of the friction plate 21a which is unsupported directly by the piston, and the area of the annular friction ring 35 are substantially equal, and that in addition to this, the friction ring 35 is substantially in alignment with the opening at the right end of the annular piston. As a result of this, when the brakes are applied by the pressure of liquid in the actuator, the mechanical force acting on one side of the metal friction plate 21a due to engagement with friction ring 35 is substantially balanced at all points on the other side by the pressure of the liquid in the annular channel of the piston, thus tending to eliminate any distortion of the friction plate which might otherwise tend to occur.

Referring now to Fig. 1, the brake valve 8 includes a spool valve 36 slidably mounted in a bore 37 of the brake valve, and provided at its right end with an enlarged piston 37a. The spool valve normally rests in the position shown at the left of the valve mechanism against a cover plate 38, and is connected to a brake pedal, not shown, by means of a rod or control element 39. A seal 41 is provided in the end cap 38 to prevent leakage of liquid from the brake valve past the rod. An annular groove 42 formed on the spool valve serves, with the valve in the position shown, to connect brake valve inlet and outlet ports 43 and 44, the main portion of the spool valve to the right of the groove 42 serving to normally close an actuator supply port 45, which is connected by a suitable conduit to the brake actuator as will be more fully described hereinafter.

The large piston 37a on the right end of the spool valve is slidably mounted in a bore 47 formed in the valve housing, and a U-shaped flexible sealing cup 48 is mounted on the right end of the piston as shown and retained in position by means of a retainer ring 49 which is biased to the left against the sealing cap by means of a spring 50 interposed between the ring and a cylinder unit 51 which is secured to the valve housing by suitable cap screws 52 and serves to close the right end of the enlarged bore 47. The left end of the large piston 37a forms, in connection with the valve housing, a chamber 53 provided at its left end with a port 54. A plurality of ports 55 extend through the piston to the surface of U-shaped sealing ring 48 for purposes which will be more fully described. In addition to the foregoing, a conical restricting valve 57 is formed on the right end of the piston at the center thereof, and is preferably provided with a valve seat 58 of rubber or other similar material which may be vulcanized to the valve 57 as shown.

The cylinder unit 51 has a flanged portion 59 secured to the right end of the valve housing by cap screws 52, and serves to close the right end of the enlarged bore 47. This cylinder unit is provided with a bore 60, and a piston 61 is slidably mounted therein and provided with a U-shaped sealing ring 62 at its right end, the ring being held in place against the right end of the piston by means of an annular retainer ring 63 and a spring 64 interposed between the ring and a cover plate 65 secured to the cylinder unit at the right end of the bore 60 by means of cap screws 66. The piston 61 is provided with a portion 67 of reduced diameter and a shoulder 68 formed in the left end of the bore 60 serves to limit movement of the piston 61 to the left as shown, the piston normally being maintained against the right end of the shoulder 68 by means of the spring 64. The end cover 65 is provided with an actuator return port 69 which is connected to the outlet of the brake actuator as will be described. It is also noted that a vent port 70 is provided in the wall of the enlarged cylinder bore 47 just to the right of the edge of the sealing cup 48, this vent being adapted to be closed by the cup during initial movement of the spool valve and large piston to the right by the operation of the brake rod 39.

The control valve also includes additional valve mechanism comprising a bore 71 closed at the left end as shown by means of flange 72 of the control valve casing, the latter being provided with a port 74. A smaller bore 75 extends to the right from the right end of the bore 71 and is provided at its left end with a valve seat 76 adapted to be normally closed by means of a valve 77. The valve 77 is provided with a stem 78 slidably mounted in a bore 79, this bore being provided with a sealing ring 80 for the purpose of preventing leakage past the valve stem. Another enlarged bore 81 is provided at the right of the bore 79 and the valve 77 is normally held against valve seat 76 by means of a spring 82 interposed between the flange 72 and the left end of the valve. A piston 87 is slidably mounted in the bore 81 and normally maintained in the position shown against end cap 65 by means of spring 89, the piston being so dimensioned and positioned as to normally be out of contact with the right end of the valve stem 78. A sealing ring 90 is provided for the piston. In addition to the foregoing, the bore 81 is provided with an atmospheric vent port 91, and the bore 75 is provided with a port 92 connecting the said bore with the enlarged bore 47 of the control valve mechanism.

Referring now to the connections between the various units shown in Fig. 1, the radiator or heat exchanger 7 may be provided with an upper liquid tank 94 connected with the upper end of the engine water jacket by a conduit 95, and a lower liquid tank 96, connected with the suction of the pump 4 by means of a conduit 97. The outlet of the pump is connected to port 43 of the control valve by means of a conduit 98, and the port 44 of the control valve is connected to the lower end of the engine water jacket by conduit 99. Thus with the parts of the control valve in the position shown and with the engine and the circulating pump 4 running, the pump draws cooling liquid from the bottom tank 96 of the radiator through conduit 97 and pumps it back to the upper radiator tank 94 through conduit 98, valve port 43, annular groove 42 of the spool valve, valve port 44, conduit 99, engine 5, and the conduit 95. In the present instance, the upper end of the radiator is also provided with an atmospheric vent conduit 100. Port 45 of the control valve is connected to the inlet conduit 14 of the brake actuator 6 by means of a conduit 101 provided with a one-way check valve 102, the check valve being so constituted as to prevent the flow of liquid from the brake actuator to the port 45, and to permit the flow of liquid in the other direction. The brake valve port 69 is connected to the outlet conduit 15 of the brake actuator by means of a conduit 103. In addition, the end plate 65 of the valve is provided with a choke 104 and a passage 105 connecting bore 60 and cylinder 81. Chamber 53 in the left hand portion of the brake valve mechanism is connected to the upper tank 94 of the radiator by means of a conduit 106, and the vent port 70 is connected with the conduit 106 by means of a conduit 107. In addition to the foregoing, the bore 71 is connected to the conduit 99 by means of port 74 and a conduit 108. It is also noted that the piston 61 is provided with a bore 109 adapted at its left end for engagement with the rubber-like valve seat 58 on the valve member 57, and that a plurality of ports 110 extend through the piston 61 as shown. Ports 110a in flange 51 connect ports 110 with bore 47.

With reference now to the operation of the brake system and particularly the operation of the control valve mechanism, it will be understood that as previously stated, with the vehicle engine running and with the parts of the valve mechanism in the position shown, cooling liquid will be drawn from the lower radiator tank 96 by the pump and returned to the upper tank 94 of the radiator through the valve ports 43 and 44, the annular valve groove 42, the block of engine 5, and the conduits previously described. Under this condition of operation the conduit 101 leading to the brake actuator 6 is isolated from the above described circulating system, and there is no tendency for the pump 4 to build up pressure in the brake actuator which would tend to cause the brakes to drag. In the event any leakage occurs from the groove 42 of the spool valve into the conduit 101, it will be noted that the enlarged bore 47 of the valve is connected to the vented upper tank of the radiator through vent port 70 and conduits 107 and 106. Since the bore 47 is connected to the brake outlet conduits 103 and 15 through the piston bore 109, the cylinder bore 60 and the port 69, it will be readily apparent that any pressure tending to build-up in the brake actuator and consequently in the conduit 103 and the bores 60 and 47 of the control valve, will be relieved by the above venting system which connects with atmosphere or a low pressure portion of the system.

In the event it is desired to apply the brake, the brake rod 39 is moved to the right, moving the valve spool 36 to the right, whereupon a land 111 on the left end of the valve spool increasingly restricts port 44. Also as the valve moves to the right, the port 45 starts to open, thus establishing communication between the groove 42 and the conduit 101 leading to the inlet conduit of the brake actuator. Thus, the normally open passage between valve ports 43 and 44 becomes restricted causing an increase in liquid pressure in the groove 42, causing cooling liquid from the engine cooling system to flow to the brake actuator through port 45, conduit 101, one-way check valve 102, and inlet conduit 14, and back to the brake valve through the brake outlet conduits 15 and 103. The tension of the springs 82 and 89 is so adjusted that the piston 87, which is responsive to the pressure in the valve cylinder bore 60, and consequently to the pressure in the conduit 103 and the outlet conduit 15 of the brake actuator, will engage the valve stem 78 and start to move the valve 77 toward open position at a pressure slightly above that required in the actuator to effect movement of the friction plate 21a into engagement with the surface of the friction ring 35. In other words, the springs 82 and 89 are preferably so adjusted that the valve 77 cannot open until the slack has been taken up between the friction plate 21a and the brake ring 35. The pressure required for this purpose is relatively low, but if desired, the springs 82 and 89 may be tensioned so as to cause the valve 77 to open at a somewhat higher pressure than that required to effect engagement of the friction plate and brake friction ring, depending on the type of operation desired.

During the above mentioned movement of the spool valve to the right, it will be apparent that the valve 57 will approach the left end of the bore 109 and tend to close it to restrict the flow of liquid from the brake to the left through the bore 109, and the parts may be so dimensioned and positioned as to cause a restricting action at the left end of the bore 109 either after the spool valve has moved to fully disconnect ports 43 and 44 and to fully connect groove 42 and port 45, or may be so adjusted as to start this restricting action after a shorter travel of the spool valve has occurred, this again depending on the characteristics of the particular brake system and on the type of operation and control desired.

In any case, however, under full power operation, the outlet conduit 98 of the pump will be connected to the inlet conduit 14 of the brake actuator as described through conduit 101 and check valve 102, and this, and/or action of large piston 37a, will serve to increase the pressure of liquid in the bore 60 until the piston 87 is moved to the left to open the valve 77. When this occurs, the bores 71 and 75 will be connected to each other, and liquid supplied to the brake by the pump as above described, or by the action of piston 37a, can return to the upper tank of the radiator from the brake outlet conduit 103 through return passages comprising port 69, bore 60, piston bore 109, enlarged cylinder bore 47, port 92, bore 75, open valve 77, bore 71, port 74, conduit 108, conduit 99, engine 5, and conduit 95, it being apparent that if the return passages leading from the bore 47 back to the radiator are of sufficient capacity, the pressure in the bore 47 of the control valve will never appreciably exceed that for which the valve 77 is set to open. It is noted in this connection, that as soon as the large piston 37a is moved to the right, the vent port 70 is closed off by the sealing ring 48, and that therefore any liquid returning from the bore 47 to the radiator must return through the port 92 and the other connections described.

During the above type of operation, and during initial movement of the spool valve and large piston 37a to the right, the entire large piston area will be subjected to the pressure existing in the bore 47, which will be limited as above described by the operation of the valve 77. As the large piston moves to the right, however, causing the valve portion 57 to restrict the left end of the bore 109 in the piston 67, the return flow of liquid from the brake through the piston bore 109 will be increasingly restricted, and since the pump 4 is preferably of the positive displacement type, the pressure in the bore 60 will accordingly increase in accordance with the increased restriction at the left end of the bore 109. As this action occurs, the increased pressure will be communicated to the piston 87 through the passage 105 and the choke 104, and as this pressure increases, the piston will be urged to move to the left against the force exerted by spring 89 and then spring 82 as well, until the left end of the piston abuts the left end of bore 81, and the valve 77 is fully opened to provide an unrestricted return passage for the liquid. The valve springs controlling the operation of the valve 77 are preferably so adjusted as to cause this wide opening to occur at a relatively low pressure in the bore 60 and in the brake, and it will be apparent that since the connection from the port 92 to the bore 71 and back to the radiator will then be substantially unrestricted and merely in the form of a bypass, the force then acting to oppose the movement of the spool valve and the large piston to the right will only be that of the relatively high pressure in bore 109 acting on the right end of the valve portion 57, plus the pressure of liquid acting on the piston 37a necessary to effect the above by-passing of the liquid back to the radiator through substantially unrestricted passages. Assuming that the pump 4 has sufficient capacity and is of sufficiently positive displacement, it will be apparent that substantially any desired degree of pressure can be built up in the brake actuator in the event the valve portion 57 is moved to the right to sufficiently restrict the opening at the left end of the bore 109 in the piston 61. Thus, during power operation alone, the travel of the spool valve is only that needed to move the valve from the position shown to a position which substantially closes the left end of the piston bore 109, and within reasonable limits, this travel can be adjusted by proper dimensioning of the parts to suit the particular type of operation desired.

With regard to the return of the spool valve and piston to the position shown when it is desired to release the brake, it will be noted that the piston and spool valve are normally urged to the left by the spring 50. During the movement of the large piston 37a to the right, it is apparent that liquid will be drawn into the chamber 53 from the top tank 94 of the radiator through the conduit 106 and the port 54, and on movement of the large piston back to the left again, this liquid can either be pumped back into the top of the radiator by the piston, or if the pressure in the chamber 53 becomes excessive due to restrictions in the conduits, liquid can also pass into the bore 47 past the sealing ring 48 through the ports 55 passing through the piston, the sealing ring 48 during this direction of movement of the piston acting in effect as a one-way check valve. When the piston returns to the off position shown, the vent conduit 107 will tend to maintain the bore 47 full of liquid, and at the same time will tend to bleed air from the bore and cylinder unit 51 in the event any air has collected therein. Thus, means have been provided for controlling the pressure of a cooling liquid flowing through the brake actuator in an amount substantially proportional to the degree of movement of the brake rod 39 and the force applied thereto, and for releasing this pressure at will and reducing the pressure of liquid in the brake actuator to substantially atmospheric pressure.

In the event the vehicle engine stops, or the circulating pump fails for any other reason, it is of course very desirable to be able to apply the brake by manual operation alone, and it is also extremely desirable that substantially the entire stroke of the brake pedal be available to effect manual operation of the brakes. Thus, with the pump inoperative, on operation of the brake pedal to move the spool valve and piston to the right in the bore 47, the vent port 70, which may be of small diameter, is immediately closed by the action of the sealing ring 48, and thereafter, until the valve 77 opens, the full displacement of the large piston 37a is available to pump liquid from the bore 47 to the brake actuator through the piston bore 109, the bore 60, the port 69, the conduit 103 and the brake outlet conduit 15, the escape of liquid from the brake through the brake inlet conduit 14 and the conduit 101 being prevented effectively by the action of the one-way check valve 102. Thus, the action is similar to that of the conventional hydraulic brake mechanism, and the large displacement of the piston 37a insures that the clearance between the brake friction plate 21a and the friction ring 35 will be taken up following a relatively small movement of the brake rod 39. As soon as this clearance is taken up, however, the pressure in the brake and in the brake valve bore 60, piston bore 109, and brake valve bore 47, as well as in the passage 105 will increase, and as soon as this exceeds the pressure for which the valve 77 is set to open, the piston 87 will act to open the valve 77 to provide a substantially unrestricted passage for liquid between the bore 47 and the upper tank of the vehicle radiator. In the event the valve 77 opens prior to the closing of the left end of the piston bore 109 by the valve 57, continued movement of the piston 37a to the right will pump liquid from the bore 47 back to the radiator through the open valve at a pressure slightly above that for which the valve 77 is set, and this will be the maximum pressure opposing the operation of the large piston 37a. The brake friction elements will remain engaged, however, and as soon as the valve seat 58 of the valve 57 engages the left end of the piston bore 109, that bore will be sealed off from communication with the bore 47, and thereafter the piston 67 will be moved to the right to increase the pressure of the liquid in the bore 60 and in the brake actuator and to manually apply the brake with a force dependent on the force exerted on the brake rod 39 by the operator. During further movement of the spool valve and piston 37a to the right after the closing of the valve 57 and the picking-up of the piston 67, there will be no slack to take up between the friction elements, and there will be very little pressure in the chamber 47 opposing the movement of the piston 37a to the right, since the pressure in cylinder 60 will be operative to hold by-pass valve 77 wide open. In view of the above, it will be apparent that the slack between the brake elements may be readily taken up, and that there will still be sufficient stroke left on the piston and on the brake rod to obtain a desired degree of pressure in the brake actuator due to the action of the relatively small piston 61 without the necessity for the operator to exert undue pressure on the brake pedal to effect this result.

Depending on the pressure for which the valve 77 is set to open, it is possible that, under manual operation, the valve 57 may close the left end of the piston bore 109 and start to move the piston 61 to the right before the valve 77 opens, in which case there will be a tendency to compress liquid in the bore 47. In the event this occurs before the valve 77 opens, the liquid will by-pass from the bore 47 into the small bore 60 to the right of the piston 61 through the ports 110a and 110 and past the edge of the U-shaped sealing ring 62, which under this condition, will act as a one-way check valve as was the case in connection with the U-shaped sealing ring 48 on the large piston 37a. In view of this, the adjustment of the valve is not critical as to the dimensioning and positioning of the parts, and satisfactory operation will be obtained regardless of whether the valve 77 opens before or shortly after the closing of the valve 57.

It is also to be noted that during manual operation, the vent port 70 and its associated connections may play an important part in the operation of the mechanism, since it tends to keep the bore 47 and the bore 60 full of liquid at all times, this of course being an essential requirement in the satisfactory operation of a manual hydraulic brake system. As heretofore stated, this vent port will also tend to bleed off any air or other gas which may tend to collect in the system.

In the event the operator finds it necessary to make an emergency manual brake application, it is conceivable that due to the inertia of the liquid in the lines and the inertia of the brake piston, the pressure in the bores 47 and 60 may momentarily become much higher than that in the brake actuator, with the result that the valve 77 may open before the friction plate 21a is in engagement with the friction ring 35. In this event, liquid may be by-passed through valve 77, with the result that the full stroke of the piston will not be available to take up the slack in the brakes. In order to overcome this difficulty, the choke 104 is provided between the passage 105 and the right end of the bore 81. As heretofore stated, there is a clearance between the piston 87 and the right end of the valve stem 78, so that liquid must be displaced to move the piston to the left before it can act to open the valve 77. Since liquid must be displaced to move the piston and open the valve, the size of the choke 104 can be so chosen as to delay this movement when a sudden pressure rise occurs in the bores 47 and 60. Thus the opening of the valve 77 will tend to be delayed until the slack can be taken up in the brakes, thus preventing the loss of stroke of the piston 37a for a manual brake application.

Figure 2:
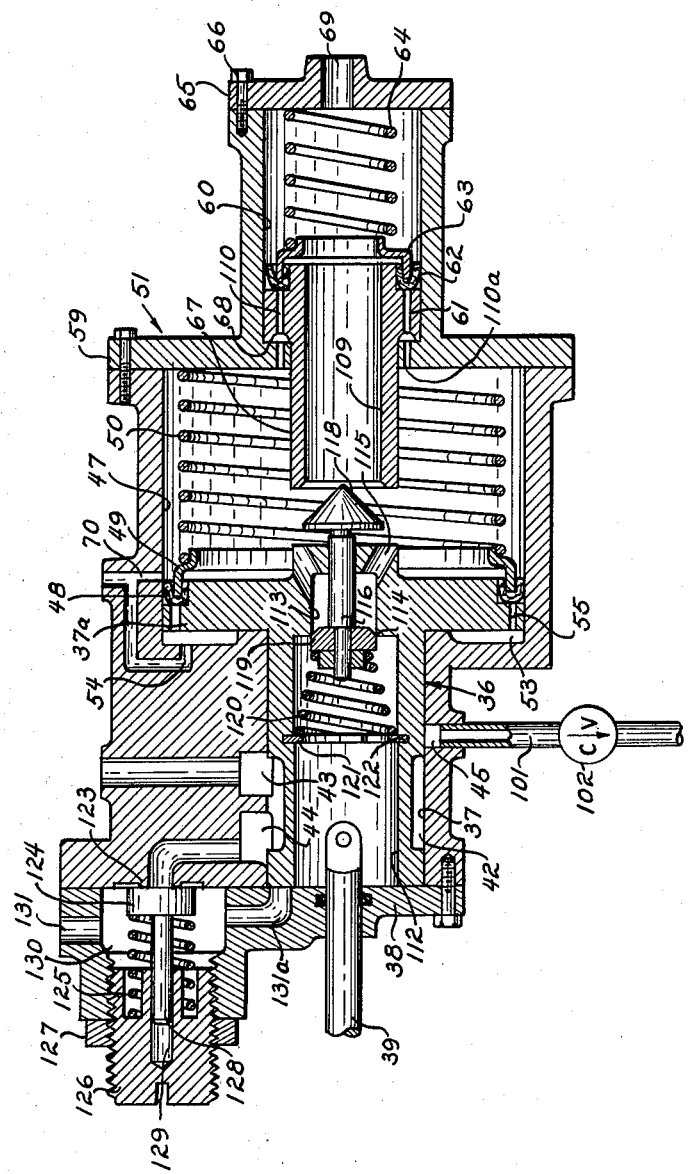
Fig. 2 is a sectional view of a modified form of brake valve constructed in accordance with the present invention.

Referring now to Fig. 2 of the drawings, a modified form of control valve is shown which is connected in the system and operates in much the same manner as the control valve previously described in connection with Fig. 1. This valve includes a spool valve 36 in a bore 37 adapted to be operated by a brake rod 39, the valve being provided with ports 43 and 44 normally connected through annular groove 42 of the spool, and a brake actuator supply port 45 normally closed by the spool as shown. A large piston 37a at the right end of the spool valve is slidably mounted in bore 47 of the valve housing, and is provided at its right end with a U-shaped flexible sealing cup 48 maintained in position by means of a retainer ring 49 and a spring 50. A chamber 53 formed at the left end of the piston 37a between the latter and the housing is provided with a port 54, a plurality of ports 55 extending through the piston from the chamber 53 to the left side of the sealing ring 48 as shown. The right end of the bore 47 is closed by flange portion 59 of a cylinder unit or member 51. This cylinder unit is provided with a bore 60, and a piston 61 is slidably mounted therein, and provided at its right end with a U-shaped sealing ring 62 maintained in position by means of an annular retainer ring 63 and a spring 64. A cover plate 65 is secured to the right end of the cylinder by cap screws 66, a port 69 being provided in the cover plate. The piston 61 is provided with a portion 67 of reduced diameter, and a shoulder 68 formed in the left end of the bore 60 serves to limit movement of the piston to the left as shown. A vent port 70 is provided in the wall of the enlarged bore 47 just at the right edge of the sealing cup 48, this vent being adapted to be closed by the cup during initial movement of the spool valve to the right.

The spool valve 36 in this modification is provided with a large bore 112 extending from the left end of the spool and connecting with a smaller bore 113 provided with a valve seat 114 at its left end. Ports 115 are provided at the right end of the piston 37a connecting the bore 113 with the bore 47, and a valve stem 116 is slidably mounted in a bore 117 at the right end of the large piston. The right end of the valve stem is provided with a conical valve 118, the other end of the stem being provided with a conical valve 119 urged against valve seat 114 by a spring 120 interposed between the valve and a split ring 121 carried in a groove 122 in the inner wall of bore 112. Valve rod 39 is connected to the spool valve as shown. Thus with the parts in the position shown, the valve 119 is normally closed, and the valve 118 is normally spaced from the left end of the bore 109 of piston 61. The port 45 on the lower side of the valve is adapted to be connected to the inlet conduit 14 of the brake actuator 6 through conduit 101 and one-way check valve 102.

In addition to the foregoing, the embodiment of the invention shown in Fig. 2 includes a one-way check or pressure regulator valve between the port 44 and the conduit 99 leading to the engine, this check valve including a valve seat 123 formed at the left end of port 44 and normally closed by means of a valve 124 urged against the seat by a spring 125 interposed between the valve and an adjustable plug 126 threadedly received by a portion of end plate 38 as shown, the plug being held in any desired position by means of a lock-nut 127. A valve stem 128 extending to the left from the valve 124 is slidably mounted in a bore 129 in the plug 126. A chamber 130 is formed at the left of the valve 124 and is provided with a port 131 adapted to be connected to conduit 99 of Fig. 1.

With the valve of Fig. 2 connected in the system as shown in Fig. 1, in the event it is desired to effect a power application of the brakes with the pump 4 in operation, the spool valve is moved to the right to restrict communication between ports 43 and 44 and to open communication between the annular groove 42 and the port 45, whereupon the pressure in the groove 42 increases sufficiently to force liquid to the brake actuator 6 through conduit 101, check valve 102, and brake inlet conduit 14, the liquid returning through conduit 103 to the brake valve, and thence back to port 131 of the brake valve through port 69, bore 60, bore 109 of piston 61, bore 47, ports 115 in the end of piston 37a, and bore 113 in the piston, the valve 114 being forced from its seat against spring 120 as soon as the pressure in the bore 113 exceeds that for which the valve is set. After passing the valve 119, the liquid proceeds to port 131 through bore 112, port 44, through the check valve 124, and into chamber 130. The valve 119 is preferably set to open at a pressure slightly above that required to move the brake shoes against the friction ring 35. With this arrangement, it will be seen that the pressure in the bore 47 can never materially exceed that required to take up the slack in the brake.

During initial movement of the spool valve and the piston 37a to the right to effect a brake application, the increase in pressure in the bore 47 and in the bore 60 may be due to the displacement of liquid by the piston 37a, or due to the restriction of the port 44 by the spool valve. In either case, on further movement of the spool valve to the right, the conical valve 118 will act to restrict the opening at the left end of the bore 109 in the piston 61, thus increasing the pressure in the bore 109, the bore 60, and also in the brake actuator, and although the pressure in the brake actuator may thus be increased, this action will not serve to increase the pressure in the bore 47 acting on the piston 37a. Thus, excessive force is not required by the operator on the brake pedal to overcome the pressure acting on the piston 37a, since valve 119 limits this force.

As the conical valve 118 more nearly approaches the end of the bore 109 of the piston 61, an increasing force will be exerted to the left on the valve 118 by the liquid passing through the bore 109, and this force will eventually become sufficient to open the valve 119 wide and thereafter hold it open until a subsequent reduction in flow occurs through the brake actuator. When the valve 119 is open wide, the pressure in the chamber 47 against which the piston 37a acts will be further decreased, and in the event the force acting to the left on the valve 118 is sufficient to fully overcome the spring 120, the left side of the valve 118 will abut the right end of the piston 37a and thereafter remain in that position until there is a subsequent decrease in the flow of liquid through the piston bore 109. In any case, following the initial portion of the movement of the spool valve 36 to the right, the valve 119 will be opened and will remain open during the remaining portion of the brake application unless the severity of the brake application is materially reduced. On initial movement of piston 37a to the right, the vent port 70 will be closed, and during further movement of the piston to the right, liquid will be drawn from the radiator into chamber 53 through the port 54, which is connected to the radiator through conduit 106 as shown in Fig. 1.

During initial operation of the spool valve to the right to effect a brake application, there will be a tendency to apply the brake manually prior to the opening of the valve 119, and prior to the restriction between ports 43 and 44 and the opening of port 45 sufficient to effect actual flow of liquid through the brakes. The check valve 102 will impose a certain restriction on such flow, and it is possible that the initial manual operation of the piston 37 to the right will build up a pressure in the brake sufficient to cause a dragging brake, while at the same time the pressure build up in conduit 101 between the valve mechanism and the check valve 102 will be insufficient to overcome this pressure and effect the flow of cooling liquid through the brake. Under this condition of operation, due to the lack of flow of cooling liquid, the brake may overheat sufficiently to cause serious damage, and in order to overcome this difficulty, which might be caused by the operator riding the brake pedal for a considerable distance, the check valve 124 has been provided. In this connection, a tension of the valve spring 125 is so chosen as to insure a positive pressure in the groove 42 with the spool valve in release position, this pressure being sufficient to insure the flow through the brake actuator as soon as the port 45 is opened even slightly. In the event the liquid pump 4 is driven by the engine, as shown, the tension of the valve spring 125 would be so chosen as to insure the flow of liquid through the brake on opening of the port 45 by the spool valve at idling speed of the engine.

In order to prevent the check valve 124 from restriction the return flow of liquid from the brake under the condition just described, a port 131a connects bore 112 and chamber 130, and is normally closed by the left end of the spool valve as shown. When the spool valve is moved to the right, this port opens before the spool valve moves sufficiently to connect port 44 with bore 112. Until port 44 is connected to bore 112, the pressure maintained in spool valve groove 42 by the action of check valve 124 is more than sufficient to open by-pass valve 119, and since liquid passing the valve 119 is free to by-pass check valve 124 through channel 131a, circulation of liquid through the brake actuator is assured as soon as port 45 is opened on initial movement of the spool valve.

Considering now the operation of the valve to effect a manual brake application in the event of failure of the pump 4, it will be apparent that on initial movement of the spool valve and piston 37a to the right, the entire area of the piston 37a will be available to displace liquid to take up the slack in the brake actuator, the flow of liquid from the brake through the conduit 101 being prevented by the one-way check valve 102. The piston 37a can continue to pump liquid into the brakes until the valve 119 opens, and assuming that a 4 pound pressure, for example, is required to take up the slack in the brakes, the valve 119 may be set to open at a pressure of 5 or 6 pounds, an arrangement which will insure that the slack of the brakes will be taken up on movement of the piston 37a to the right to first close the port 70 and to thereafter pump liquid into the brakes. During such movement of the large piston to the right, liquid will be drawn from the radiator through the passage 54. In the event the valve arrangement is such that the pressure in bore 47 exceeds that necessary to open the valve 119 before the conical valve 118 engages the left end of the bore 109, the remaining portion of the stroke required to effect engagement between the valve 118 and the end of the bore 109 wil merely pump liquid to the left past the valve 119 and back to the system through the spool valve and port 44 at the pressure for which the valve 119 is set. As soon as the valve 118 engages the bore end 109, further communication between 109 and bore 47 will cease, and on further movement of the piston 37a to the right, the valve 119 will be opened wide and the conical valve 118 will abut the right end of piston 37a and thereafter move the small piston 61 to the right to further increase the pressure of the liquid in the bore 60 and in the brake actuator. Since under this condition the valve 119 is fully opened, any further liquid pumped by the piston 37a will simply by-pass the valve to a low pressure area of the system without causing any appreciable drag or a parasitic load on the brake pedal.

Another modification of the control valve is shown in Fig. 3, and here again the valve includes a spool valve 36 slidably mounted in a bore 37, the spool valve being provided at its right end with an enlarged piston 37a. The spool valve is connected to a brake pedal, not shown, by means of a brake rod 39, and the valve includes an annular groove 42 on the valve spool serving to normally connect ports 43 and 44. An outlet port 45 is normally closed by the spool valve. The large piston 37a is slidably mounted in a bore 47, the piston having a U-shaped sealing cup 48 held in position by an annular retainer ring 49 and a spring 50. A chamber 53 is formed between the valve housing and the left end of the piston 37a, and is adapted to be connected to the upper tank of the vehicle radiator by a passage 54. A plurality of ports 55 extend through the piston from the chamber 53 to the left side of the sealing ring 48. The right end of the piston 37a is provided with a conical valve 57.

The right end of the bore 47 is closed by flange portion 59 of a cylinder unit or member 51, the flange being secured to the main body of the valve by cap screws 52. The cylinder member 51 includes a bore 60 having a piston 61 slidably mounted therein and provided with a U-sealing cup 62 held in position by a retainer ring 63 and a spring 64. The left end of the piston has a portion 67 of reduced diameter, and a bore 109 extends through the piston and is adapted to be engaged by the conical valve 57 on the large piston 37a. A port 69 in a cover plate 65 which closes the right end of the bore 60 is adapted to be connected to the brake actuator 6 through conduit 103 as shown in Fig. 1.

Referring now to the construction of the spool valve 36, a bore 133 in the left hand end of the spool valve has a piston 134 slidably mounted therein and provided with a sealing ring 135. A plug 136 having a sealing ring 137 thereon is mounted in the bore against a split ring 138, and serves as an abutment to limit the movement of the piston 134 to the left. The piston 134 is normally held in the position shown by means of a spring 139 interposed between the piston and the left side of a partition 140 formed in the spool valve at the right hand end of the bore 133, a chamber 141 being interposed between the partition and the end of the bore 133. A plurality of ports 142 extend through the spool valve from the chamber 141 to the left end of the valve as shown, serving as return ports for the liquid from the brake actuator as will be hereinafter more fully described.

The partition 140 is provided with a bore 143 having a valve seat 144 at its right end adapted to receive a valve 145, the latter being normally urged against the seat by a spring 146 as shown. A chamber 147 formed in the spool valve at the right of the partition 140 is connected to the bore 47 by ports 148. A valve stem 149 extends through the conical valve 57 as shown in a bore 150, a sealing ring 151 being in sliding engagement with the valve stem. At the left side of the valve 145, an elongated valve stem 152 extends into a bore 153 in the piston 134, the bore 153 extending to the left of the end of the valve stem 152 as shown and having an end wall 154 which forms an abutment adapted to engage the left end of the valve stem 152 on movement of the piston to the right as will be hereinafter described. The left end of the bore 153 in the piston is provided with a bore 155 extending through the left end of the piston. A centrally located bore 156 of reduced diameter extends entirely through the valve stems 149 and 152 from one end to the other as shown.

In the present instance, the one-way check valve 102 shown in Fig. 1 is incorporated in the control valve itself. A valve seat 158 below the port 45 is adapted to receive a check valve 159 urged against the seat by a spring 160 interposed between the valve and a plug 161 threadedly received in a bore 162 in the housing. A valve stem 163 is slidably mounted in a bore 164 in the plug, and a port 165 in the wall of the bore 162 is adapted to be connected to the conduit 101 leading to the actuator as indicated in Fig. 1 of the drawings. As was the case in Fig. 1, a plurality of ports 110 through the piston 61 serve to connect the left side of the piston to the left face of the U-shaped sealing ring 62. A vent port 70 in the wall of bore 47 is normally uncovered by sealing ring 48 on the piston 37a and is connected to the upper tank of the radiator as has been described heretofore. It will be understood that the valve is connected in the system in the same manner as shown in Fig. 1.

Describing first the operation of the brake valve mechanism in effecting a power application to the brakes, it will be understood that the operation of the spool valve in controlling the connections of the ports 43, 44 and 45 will be identical with that described in connection with Figs. 1 and 2. The return route for the liquid from the brake through the bore 109 and the bore 47 is through the ports 148 in the spool valve, the chamber 147, the port 143, the chamber 141, the passages 142 and thence to port 44, but such flow of fluid is normally prevented by the closed valve 145. On movement of the spool valve and the large piston 37a to the right, the large piston pumps liquid into the brake actuator to take up the slack between the friction element 21a and the brake ring 35, and thereafter, when a predetermined pressure is built up in the bore 47, preferably slightly higher than that required to take up the slack in the brakes, the valve 145 is opened, and thereafter remains open at all pressures above that for which the valve is set.

As the pressure builds up in the bore 47 and in the bore 109, this pressure will be communicated to the left end of the piston 134 through the restricted bore 156 in the valve stem, and the piston bores 153 and 155, thus urging the piston 134 to the right against the spring 139 until the left end of the bore 153 abuts the left end of the valve stem 152 and moves the valve 145 to the right off its seat against the tension of the valve spring 146 as well as against the pressure which may obtain in the chamber 147 at the right of the valve. As the pressure increases in the bore 47 and/or in the bore 109, the force to the right on the piston 134 will increase and the opening of the valve will increase as the pressure increases, until the valve is fully open.

Since a sudden application of force on the brake rod 39 by the operator to apply the brake may result in sudden increase in pressure in the chamber 47 above that required to take up the slack in the brakes, the restricted passage 156 is provided extending through the valve stem of the valve 145 in order to momentarily restrict the flow of liquid to the left end of the piston 134 and thus delay the opening of the valve, this being possible due to the lost motion connection between the piston and the left end of the valve stem 152 which requires the displacement of liquid through the passage 156 in the valve stem prior to engagement of the valve stem 152 by the piston 134.

As soon as the slack in the brakes is taken up, further movement of the piston 37a to the right will serve to pump liquid back into the low pressure side of the system as in Fig. 1 through the passages described in the spool valve and through the open valve 145, and the conical valve 57 will increasingly restrict the opening at the left end of the bore 109 in the small piston 61 to thus restrict the return flow of liquid from the brake and increase the pressure of the liquid in the brake, it being noted as heretofore stated that the pump 4 is preferably of the positive displacement type in order to permit this type of operation. At the higher pressures, the valve 145 will remain open as stated, and since the restriction to the return flow of liquid from the brakes occurs between the conical valve 55 and the end of the bore 109, the pressure to which the left end of the piston 134 is subjected will, during power operation, be substantially that which obtains in the bore 109, rather than that which obtains in the bore 47, and the valve 145 will be held open.

Considering now the operation of the valve during a manual application with the pump 4 inoperative, the operation is again substantially similar to that set forth in connection with the structure shown in Fig. 1. On movement of the large piston 37a to the right, the piston will serve to pump liquid into the brakes through the passages described to take up the slack in the brakes, and thereafter the pressure will rise in the bore 47 sufficiently to cause the valve 145 to open and remain open as heretofore described. On further movement of the piston 37a, the conical valve 57 will engage and close the left end of the bore 109, and thereafter move the small piston 61 to the right to increase the pressure in the brakes to the desired value manually. The escape of the liquid from the brake actuator in one direction will be prevented by the operation of the check valve 102, and in the other direction by the closed conical valve 57.

In the event the conical valve 57 closes the end of the bore 109 before all the slack is taken up in the brakes, and before the pressure in the bore 47 increases sufficiently to cause the opening of the valve 145, further movement of the piston 37a to the right will increase the pressure in the bore 47, and liquid will be pumped into the bore 60 through ports 110a in the cylinder unit 51 and ports 110 in the piston 61, the U-shaped sealing ring 62 acting under these conditions as a one-way check valve to permit the passage of fluid from the bore 47 to the bore 60. As soon as the slack in the brakes is taken up under this type of operation, the pressure in the bore 109 will increase and be transmitted through valve stem bore 156 to the left side of the piston 134 to force the latter to the right to open the valve 145 to thereafter permit substantially unrestricted flow of liquid from the bore 47 to the low pressure side of the system through the connections heretofore described.

Figure 3:
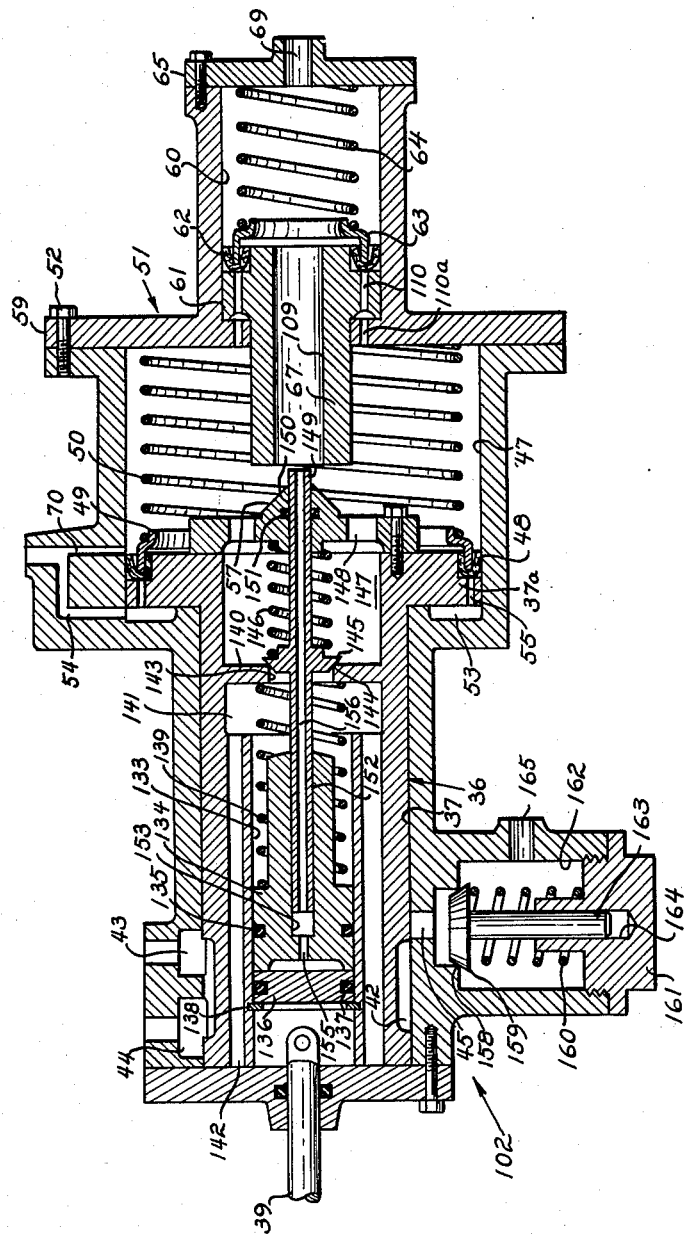
Fig. 3 shows another modified form of brake valve mechanism.

In comparing Fig. 3 with Fig. 1, it should be noted that the operation of the valve 145 in Fig. 3 is somewhat different from that of the valve 77 in Fig. 1. In Fig. 1, the pressure in bore 47 acts against the valve in the direction of valve opening, and therefore tends to assist the action of the piston 87 in opening the valve, the nature of this action depending somewhat on the tension chosen for the valve spring 82. In the structure of Fig. 3, on the other hand, the valve has to be opened against the pressure in the bore 47, and consequently this pressure acting on the valve opposes the opening of the valve by the action of the piston 134. When the pressure on the piston 134 builds up sufficiently to open the valve, however, against the pressure acting thereon in the chamber 147 and against the tension of the valve spring 146, the pressure force acting on the valve to the left will tend to disappear as the valve has left its seat, and consequently the valve will tend to open wide, or to have a snap action which will immediately open the valve to present an unrestricted passage therethrough as soon as the pressure acting on the piston 134 reaches that for which the valve is set to open. This may have distinct advantages in some cases, depending on the particular type of operation desired.

It will be readily apparent from the foregoing detailed description and from a study of the drawings, that novel and efficient brake control valve mechanism has been provided particularly adapted to control both manual and power operation of a brake of the circulating liquid cooled type shown in Fig. 4, wherein the pressure of the circulating liquid is also utilized to effect operation of the brake actuator. During initial movement of the brake rod, the brakes are applied manually to a certain extent, at least to the point of taking up the slack in the brakes, and since this occurs almost instantaneously as soon as the piston and spool valve are moved sufficiently to close the small bleed port 70, a very quick application of the brakes can be made without delay on the part of the operator, and thereafter the return flow of liquid from the brake may be restricted as desired in accordance with the degree of movement of the brake rod in order to accordingly increase or control the actuating pressure of the liquid in the brake actuator 6. The construction is such that as soon as the brake pressure is increased sufficiently to take up the slack in the brakes, the load due to this pressure acting on the large piston 37a, and consequently acting on the brake rod 39 and on the operator's brake pedal disappears, and thereafter, under power operation, the only force required to apply the brakes and hold the brakes applied with any desired degree of pressure is that due to the action of the pressure in the bore 109 on the area of the conical valve 57.

During manual operation, liquid is pumped into the brakes with the large displacement piston 37a as soon as the small port 70 is closed, and continues to be pumped into the brakes on further movement of the brake rod until the pressure in the brakes reaches a pressure slightly above that required to take up the slack in the brakes. Thereafter the pressure load on the large piston is relieved and remains relieved during further brake application, and the small piston 61 is operated to further increase the brake pressure at the will of the operator. Since the slack is all taken up before the small piston becomes effective, it will be apparent that the leverage between the brake pedal and the brake rod 39 can be so arranged as to give the operator a large mechanical advantage in effecting the manual brake application in the event of power failure.

The term "positive displacement pump" as utilized in this specification refers to pumps such as piston, vane or gear types, wherein, except for slight leakage past the pistons, vanes or gears, the volume of liquid pumped is directly proportional to the pump speed, regardless of the pressure of the liquid delivered by the pump. Thus if the outlet of the pump is restricted, the pressure of the liquid in the conduit between the pump and the restriction will increase, but the volume of liquid pumped will remain unchanged. While it might be thought that the valves 57 of Figs. 1 and 3 and 118 of Fig. 2 could be fully closed by the operator and thus entirely cut off the flow of cooling liquid through the brake, this is not the case if the parts are properly proportioned. The pressure builds up rapidly as the valve is closed, and since the operator has to close the valve against this force, it has been found in actual operation of such valves that the operator never exerts enough force on the brake pedal to fully close the valve.

It will also be noted that in the event of power failure and an emergency brake application by the operator under manual control, the tendency for the by-pass valve which by-passes the large piston 37a to open under such conditions, with a resultant loss in the pedal stroke available for manual operation, is effectively prevented by the choke means shown and described in connection with Figs. 1 and 3. In addition to the foregoing, and as explained more particularly in connection with Fig. 2, means are also provided, effective during power operation, which may be adapted for use in connection with the structures of Figs. 1 and 3, for insuring the flow of cooling liquid through the brake actuator whenever the pressure supplied to the brake actuator by the operation of the valve mechanism is sufficient to effect dragging of the brakes which might otherwise result in overheating of the elements thereof and damage thereto.

From the foregoing, it will be apparent that the invention is not limited to the specific forms described and illustrated, but may be embodied as well in other equivalent forms within the scope of the appended claims, as will be well understood by those skilled in the art.

What is claimed is:

1. A liquid-cooled and liquid pressure operated brake system including a brake actuator having ports for supplying cooling liquid to the actuator and for discharging liquid therefrom, a movable friction element subjected to the cooling action of the liquid therein, pressure responsive means associated with said element and subjected to the pressure of liquid in said actuator, a cooling liquid circulating pump having suction and discharge ports, and control valve mechanism for controlling the circulation and pressure of liquid in the actuator when the circulating pump is operating and for pumping the liquid into the actuator to effect a brake application when said circulating pump is inoperative, said control valve mechanism including a control element having a release position, a casing having inlet and outlet ports connected respectively with the pump discharge and suction ports, a supply port connected with one of said actuator ports, manually operable liquid pumping means including a pair of cylinders in the casing and a piston in each cylinder, a return port in one of said cylinders having a connection with the other of said actuator ports, valve means connected to and movable by said control element and effective on movement of the control element from release position to disconnect said casing inlet and outlet ports and to connect said casing inlet port and said supply port, a connection between said cylinders, said connection being open with the control element in said release position, means connecting the control element and the piston in the other of said cylinders and effective on initial movement of the control element from release position to move the piston in said other cylinder to pump liquid to the actuator through said open connection, said one cylinder, and said return port, means effective on movement of said control element from release position for sequentially restricting and closing said connection between said cylinders and for thereafter moving the piston in said one cylinder to pump liquid to the actuator through said return port, a one-way check valve connected between said supply port and actuator for conducting liquid from said supply port to the actuator and for preventing the flow of liquid in the reverse direction, a connection between said other cylinder and the outlet port of said casing, and by-pass valve means associated with said last named connection, said by-pass valve means being responsive to the pressure in at least one of said cylinders and so constituted as to open when the pressure of liquid pumped to the actuator by the operation of said manually operable pumping means exceeds a predetermined value.

2. A liquid-cooled and liquid pressure operated brake system as set forth in claim 1, wherein biasing means are provided for normally maintaining said friction element in a release position, and the pressure responsive by-pass valve means is so constituted as to open when the pressure of liquid pumped to said brake actuator by the operation of said manually operable pumping means exceeds slightly the pressure necessary to overcome said friction element biasing means and move the friction element.

3. A liquid-cooled and liquid pressure operated brake system as set forth in claim 1, wherein one-way check valve means is provided between said cylinders, said check valve means being effective to conduct liquid therethrough from the other of said cylinders to said one cylinder when said connection between said cylinders is closed by movement of said control element from release position and effective to prevent the flow of liquid therethrough between said cylinders in the reverse direction.

4. A liquid-cooled and liquid pressure operated brake system as set forth in claim 1, wherein a pressure responsive element is provided for operating said by-pass valve means to open the latter, and said pressure responsive element is subjected to the pressure in said one cylinder through a restricted passage.

5. A liquid-cooled and liquid pressure operated brake system as set forth in claim 1, wherein the other of said cylinders is provided with an atmospheric connection for preventing the build-up of pressure in the brake actuator, said atmospheric connection being open when the control element is in release position, and means are provided effective on initial movement of the control element and the piston in said other cylinder from release position for closing said port.

6. A liquid-cooled and liquid pressure operated brake system as set forth in claim 1, wherein said other cylinder is connected at one side of the corresponding piston with said one cylinder through said open connection between the cylinders when the control element is in release position, and said other cylinder at the other side of the corresponding piston is provided with an atmospheric connection.

7. A liquid-cooled and liquid pressure operated brake system as set forth in claim 1, wherein said other cylinder at one side of the corresponding piston is connected to said one cylinder through said open connection when the control element is in release position, and said other cylinder at the other side of the corresponding piston is connected to the casing outlet port.

8. A liquid-cooled and liquid pressure operated brake system as set forth in claim 1, wherein said other cylinder at one side of the corresponding piston is connected with said one cylinder through said connection between said cylinders when the control element is in release position, said other cylinder at the other side of the corresponding piston is connected to the casing outlet port, and which includes one-way check valve means associated with the piston in said other cylinder, said check valve means being effective to prevent the passage of liquid from said one side of the piston to said other side, and effective to conduct liquid between said sides in the opposite direction.

9. A liquid-cooled and liquid pressure operated brake system as set forth in claim 1, wherein the area of the piston in said other cylinder is greater than the area of the piston in said one cylinder.

10. A liquid-cooled and liquid pressure operated brake system including a brake actuator having ports for supplying cooling liquid to the actuator and for discharging liquid therefrom, a movable friction element subjected to the cooling action of the liquid therein, and pressure responsive means associated with said element and subjected to the pressure of liquid in said actuator, a cooling liquid circulating pump having suction and discharge ports, and control valve mechanism for controlling the circulation and pressure of liquid in the actuator when the circulating pump is operating and for pumping liquid into said actuator to effect a brake application when said circulating pump is inoperative, said control valve mechanism including a casing having inlet and outlet ports connected respectively with the pump discharge and suction ports, a supply port connected with one of the actuator ports, a control valve element having a release position and movable therefrom to effect a brake application, valve means connected to and movable by said element effective with said control element in release position to connect said casing inlet and outlet ports and to prevent communication between said casing inlet port and said brake supply port and effective on movement of said control element from release position to disconnect said casing inlet and outlet ports and to connect said casing inlet port and brake supply port, a pair of cylinders in said casing, one of said cylinders having a return port connected with one of said actuator ports, and a piston in said one cylinder having a bore therethrough for connecting said one cylinder with the other of said cylinders, a piston in the other of said cylinders connected with said control element and movable thereby, a bore extending through said valve means, means effective on movement of said valve means and control element from release position to connect said bore in said valve means with the outlet port of said valve mechanism, a valve for closing said bore in said valve means, biasing means for biasing said valve toward closed position and so constituted as to cause the pressure of liquid in the other of said cylinders to open said valve when said pressure is increased to a predetermined value, a restricting valve connected to the first named valve and positioned to sequentially restrict and close one end of the bore of the first named piston on movement of the valve means and control element from release position to effect a brake application, and an abutment on the second named piston for limiting the degree of movement of said restricting valve and first named valve on engagement of the restricting valve with the end of the bore in said one piston, said restricting valve being effective on further movement of said control element and valve means following engagement of the restricting valve with said abutment to move the first named piston bodily to pump liquid from said one cylinder into said actuator through said return port, and a one-way check valve interconnected between the supply port of said valve mechanism and said other actuator port and being so constituted as to conduct liquid from the supply port to the actuator port and to prevent the flow of liquid in the reverse direction.

11. A liquid-cooled and liquid pressure operated brake system as set forth in claim 1, wherein means are provided in the actuator for biasing said friction element toward a release position, and the biasing means for the bore closing valve associated with said valve means for closing the bore in the valve means is so adjusted as to maintain said valve in closed position until the pressure of the liquid in the other of said cylinders substantially equals or exceeds the pressure required to overcome said friction biasing means and to remove said friction element.

12. Control valve mechanism for a brake actuator of the type adapted to be cooled by a liquid circulating therethrough and adapted to be actuated by the pressure of said liquid, said control valve mechanism including a casing having inlet and outlet ports, a supply port, a return port, a valve operating element having a release position and movable to applied positions, valve means operable by said element for controlling the flow of liquid between all of said ports, said valve means being operable with said element in release position to connect said inlet and outlet ports and to prevent communication between said supply port and said inlet port and operable on movement of said element from release position to disconnect said inlet and outlet ports and to connect said inlet and supply ports, manually operable liquid pumping means for pumping brake actuating liquid to the return port in the casing including a pair of cylinders in the casing, one of said cylinders being connected with said return port and having a piston in the cylinder having a bore therethrough for connecting said return port with the other of said cylinders through said bore in said one cylinder and said bore of said piston in said one cylinder, a restricting valve connected with said control element and adapted on movement of the control element a predetermined distance from release position to engage the end of the bore of the piston in said one cylinder to prevent communication between the cylinders through said bore and operable on further movement of the control element to move said one piston to pump liquid from said one cylinder through said return port, a piston in the other of said cylinders connected with said control element and operable on initial movement of said element from release position to pump liquid from said other cylinder to said return port through said piston bore and said one cylinder, a by-pass connection between said other cylinder and said outlet port, a one-way check valve connected with said supply port for conducting liquid from the valve casing through said port and for preventing the flow of liquid in the reverse direction, and by-pass valve means in said by-pass connection, said by-pass valve means being responsive to the pressure in one of said cylinders, and being adapted to open when said pressure exceeds a predetermined value.

13. Control valve mechanism for controlling the circulation and pressure of a cooling liquid in a liquid-cooled brake actuator of the type adapted to be operated by the pressure of said circulating liquid and for manually pumping liquid to the actuator to effect a brake application, said control valve mechanism including a casing having inlet and outlet ports, a supply port, a return port, a valve operating element having a release position and movable to applied positions, valve means operable by said element on movement of said element from said release position for increasingly restricting communication between said casing inlet and outlet ports and for increasingly establishing communication between said inlet and supply ports, manually operable liquid pumping means in said casing including a pair of cylinders having pistons therein, one of said cylinders being connected with said return port, and the piston in the other of said cylinders having a connection with said control element, a connection between said cylinders, means connected with said control element and movable thereby to sequentially restrict said connection between said cylinders, to close said connection, and to thereafter move said one piston to pump liquid from said one cylinder through said return port, a by-pass connection between said other cylinder and said outlet port, and pressure responsive valve means in said by-pass connection, said pressure responsive valve means being so constituted as to open said by-pass connection when the pressure of liquid pumped to said return port by said manually operable pumping means exceeds a predetermined value.

14. Control valve mechanism as set forth in claim 13, wherein said cylinders are connected by means of a one-way check valve, said check valve being separate from said connection between the cylinders and being effective to conduct liquid therethrough from said other cylinder to said one cylinder and to prevent the flow of liquid therethrough between said cylinders in the reverse direction.

15. Control valve mechanism as set forth in claim 13, wherein a separate pressure responsive member is provided for operating said valve means in said by-pass connection, said pressure responsive member being responsive to the pressure in said one cylinder and having a lost motion connection with said last named valve means.

16. Control valve mechanism as set forth in claim 13, wherein a separate pressure responsive element is provided for operating said pressure responsive valve means in said by-pass connection, said pressure responsive valve means is biased toward closed position by the pressure in said other cylinder, and said pressure responsive element for operating the pressure responsive valve means is subjected to the pressure in said one cylinder through a restricting connection.

17. Control valve mechanism as set forth in claim 13, wherein a separate pressure responsive member is provided for operating said pressure responsive valve means in said by-pass connection, said pressure responsive member being responsive to the pressure in both cylinders when said connection between said cylinders is open, and being responsive to the pressure in said one cylinder when said connection between said cylinders is closed.

18. Control valve mechanism as set forth in claim 13, wherein a pressure regulator valve is associated with said outlet port, said regulating valve being so constituted as to prevent the flow of liquid from the casing through said outlet port until the pressure of the liquid in said outlet port exceeds a predetermined value.

19. Control valve mechanism as set forth in claim 13, wherein said other cylinder is provided with an atmospheric port, and means are provided operable on initial movement of said control element from release position for closing said atmospheric port.

20. Control valve mechanism for controlling the circulation and pressure of a cooling liquid in a liquid-cooled brake actuator of the type adapted to be operated by the pressure of said circulating liquid and for manually pumping the liquid into the actuator to effect a brake application, said brake valve mechanism including a casing having inlet and outlet ports, a supply port, and a return port, valve means in said casing having a release position and effective in said position to connect said inlet and outlet ports and to prevent communication between said inlet port and said supply port and effective on movement from said release position to disconnect said inlet and outlet ports and to connect said inlet port with said supply port, a pair of cylinders in the casing, pistons in said cylinders sequentially operable for pumping liquid from said casing through said return port, a control element for operating said valve means and pistons having a release position, a check valve associated with said supply port for preventing the flow of liquid into said valve casing through said supply port and for conducting liquid in the opposite direction, means controlled by said element for restricting the flow of liquid between said cylinders, a by-pass connection between one of said cylinders and said outlet port, and valve means associated with said by-pass connection and effective when the pressure in said one cylinder exceeds a predetermined value for connecting said one cylinder with said outlet port through said by-pass connection.

21. Brake control valve mechanism as set forth in claim 20, wherein the valve means associated with said by-pass connection is provided with means engageable with the piston in the other cylinder for mechanically opening said valve means when said control element is moved a predetermined distance from release position.

22. Control valve mechanism for controlling the circulation and pressure of a cooling liquid in a liquid-cooled brake actuator of the type adapted to be operated by the pressure of said circulating liquid and for manually pumping liquid into the actuator to effect a brake application, said brake valve mechanism including a casing having inlet and outlet ports, a supply port, a return port, a valve operating element having a release position and movable to applied positions, valve means operable by said element for controlling the flow of liquid between said ports, said valve means being effective in release position to connect said inlet and outlet ports and to prevent communication between said supply port and said inlet port and effective on movement thereof from release position by said element to disconnect said inlet and outlet ports and to connect said inlet and supply ports, manually operable liquid pumping means in said casing including a pair of cylinders having pistons therein, one of said cylinders being connected with said return port, the piston in the other of said cylinders having a connection with said control element, a connection between said cylinders, means connected with said control element and movable thereby to sequentially restrict said connection between said cylinders, to close said connection, and to thereafter move the piston in said one cylinder to pump liquid from said one cylinder through said return port, a by-pass connection between said other cylinder and said outlet port having a by-pass valve therein, said by-pass valve being biased toward closed position by the pressure of liquid in said other cylinder, a third cylinder having a connection with said other cylinder and a third piston therein for operating said by-pass valve in said by-pass connection, the area of said third piston being larger than the area of said valve, and said third piston having a lost motion connection with said by-pass valve.

23. Control valve mechanism as set forth in claim 22, wherein said by-pass connection, by-pass valve, and said third cylinder and the piston therein, are carried by the valve means operable by said control element, and said third cylinder is connected with said other cylinder in the valve casing by means of a restricted passage extending through the stem of said by-pass valve.

24. Control valve mechanism for a brake actuator of the type adapted to be cooled by a liquid circulating therethrough and adapted to be actuated by the pressure of said liquid, said valve mechanism including a casing having inlet and outlet ports, a supply port, a return port, valve means for controlling the flow of liquid between said ports, a control element for operating said valve means, said control element having a release position, and said valve means being operable by the control element on movement of said element from release position to progressively disestablish communication between said inlet and outlet ports and to establish communication between said inlet and supply ports, a pair of liquid pumps, one of said pumps being directly operated by said control element on movement thereof from release position to cause said one pump to pump liquid through said return port and the other of said pumps being operated by said control element on movement thereof a predetermined distance from release position to cause said other pump to pump liquid through said return port, a by-pass connection between said one pump and said outlet port and means responsive to the pressure of liquid in at least one of said pumps for opening said by-pass connection and limiting the pressure of liquid in said one pump to a predetermined value, said by-pass connection when open serving to conduct liquid from said one pump to said outlet port to limit the pressure in said one pump.

References Cited in the file of this patent

UNITED STATES PATENTS

| | | |
|---|---|---|
| 1,664,680 | Hallett | Apr. 3, 1928 |
| 2,036,342 | Loweke | Apr. 7, 1936 |
| 2,170,593 | Moore | Aug. 22, 1939 |
| 2,226,457 | Whittingham | Dec. 24, 1940 |
| 2,321,479 | Freeman | June 8, 1943 |
| 2,406,304 | Levy | Aug. 20, 1946 |
| 2,821,272 | Sanford et al. | Jan. 28, 1958 |

UNITED STATES PATENT OFFICE

CERTIFICATE OF CORRECTION

Patent No. 2,954,854                                          October 4, 1960

Wilfred A. Eaton et al.

It is hereby certified that error appears in the above numbered patent requiring correction and that the said Letters Patent should read as corrected below.

In the grant, lines 3 and 14, and in the heading to the printed specification, line 5, for "Erling D. Sedengren", each occurrence, read -- Erling D. Sedergren --.

Signed and sealed this 12th day of September 1961.

(SEAL)
Attest:

ERNEST W. SWIDER                                      DAVID L. LADD
Attesting Officer                                        Commissioner of Patents
                                                                                          USCOMM-DC